United States Patent [19]

Troutman

[11] 4,195,204
[45] Mar. 25, 1980

[54] SIGNAL MIXER CIRCUIT

[75] Inventor: Gary L. Troutman, Littleton, Colo.

[73] Assignee: Honeywell, Inc., Minneapolis, Minn.

[21] Appl. No.: 676,864

[22] Filed: Apr. 14, 1976

[51] Int. Cl.² .............................................. H04J 3/16
[52] U.S. Cl. .............................. 370/84; 340/366 CA;
 358/147; 370/77
[58] Field of Search ........ 179/15 BV, 15 AS, 15 BW,
 179/15 BY, 15 A, 15 BL; 178/DIG. 23;
 128/2.1 A, 2.06 G, 2.06 R; 340/366 A, 366 CA

[56] References Cited
U.S. PATENT DOCUMENTS

| | | | |
|---|---|---|---|
| 3,304,372 | 2/1967 | Filipowsky | 179/15 AS |
| 3,440,342 | 4/1969 | Beltrami | 178/DIG. 23 |
| 3,641,273 | 2/1972 | Herold | 179/15 BW |
| 3,668,645 | 6/1972 | Reymond | 179/15 AS |
| 3,745,242 | 7/1973 | Justice | 178/DIG. 23 |
| 3,811,008 | 5/1974 | Lee | 178/DIG. 23 |

Primary Examiner—David L. Stewart
Attorney, Agent, or Firm—Laurence J. Marhoefer;
Lockwood D. Burton

[57] ABSTRACT

A multi-data recording system includes apparatus for generating two control signals of different frequency characteristics. A mixer is provided for interleaving the two types of signals. The display and recording of the data signals is accomplished under the control of the resulting composite signal from the mixer.

4 Claims, 2 Drawing Figures

SIGNAL MIXER CIRCUIT

BACKGROUND OF THE INVENTION

1. Field of the Invention

The present invention relates to electronic control circuit, and more particularly to a circuit for controlling the mixing of two signals of differing frequencies.

2. Description of the Prior Art

In a number of instances it is desirable to have means for controlling an output device at different frequencies during alternate periods. In the prior art, there have been provided circuit schemes for accomplishing interleaving of signals of different wave forms. An example of such a patent is Patrickson U.S. Pat. No. 3,657,558 wherein ramp generators are alternately triggered into operation to provide interleaved signals of different slope and duration. These are interleaved individual pulse signals.

In certain recording fields, for example in the area of recording certain medical data, it is highly desirable to have the facility for recording several different types of data on the same record member. In at least one such application, one type of data to be recorded is of necessity a relatively slow response type signal. In recording a plurality of different type signals substantially simultaneously on the same record member it is the usual practice to multiplex the several signals for application to the control of the recording instrumentality which may, for example, be a cathode ray tube type recording device. If the multiplexing and data sampling occur at the rate determined by the slowest response type signal, it is quite probable that significant data changes in the faster response type signals will be lost. An example of such a multiple data recording instrumentality is seen in an instrument which responds to and records signals both from an ultrasound scanner and from body function detectors such as electrocardiograph sensors. As is known in the art, the ultrasound scanner is a device which responds to sonic type waves to provide an echo signal imaging of body elements and constitute relatively slow response type signals. On the other hand, signals representative of electrocardiograph data include high frequency components which, if they are sampled at the slower rate of the echo signals would tend to lose substantial definition. In order to properly record both the echo data and the electrocardiograph data it would be necessary to have sampling control signals of lower frequency to control the sampling and scanning of the echo signals and a higher frequency control signal for controlling the sampling and scanning of the electrocardiogram signals. The interleaving of single pulse signals of different wave forms such as that shown in the aforementioned Patrickson patent would not provide the necessary control signals for this application.

SUMMARY OF THE INVENTION

It is, accordingly, an object of the present invention to provide an improved control system for controlling the operation of a multi-data recording apparatus.

It is another object of the present invention to provide an improved control system as set forth wherein control signals of two different frequencies are interleaved to effect the desired control.

It is a further object of the present invention to provide an improved signal mixer for interleaving two signals of different frequencies to provide an output composite signal.

In accomplishing these and other objects, there has been provided, in accordance with the present invention, a mixing circuit wherein a first control signal of spaced pulses of relatively slow ramp time is used to provide a primary control. A second signal of substantially higher frequency is gated to provide an interval number of high frequency pulses between successive ones of the slow ramp signals.

BRIEF DESCRIPTION OF THE DRAWINGS

A better understanding of the present invention may be had from the following detailed description when read in the light of the accompanying drawings, in which.

DETAILED DESCRIPTION

Figure 1:
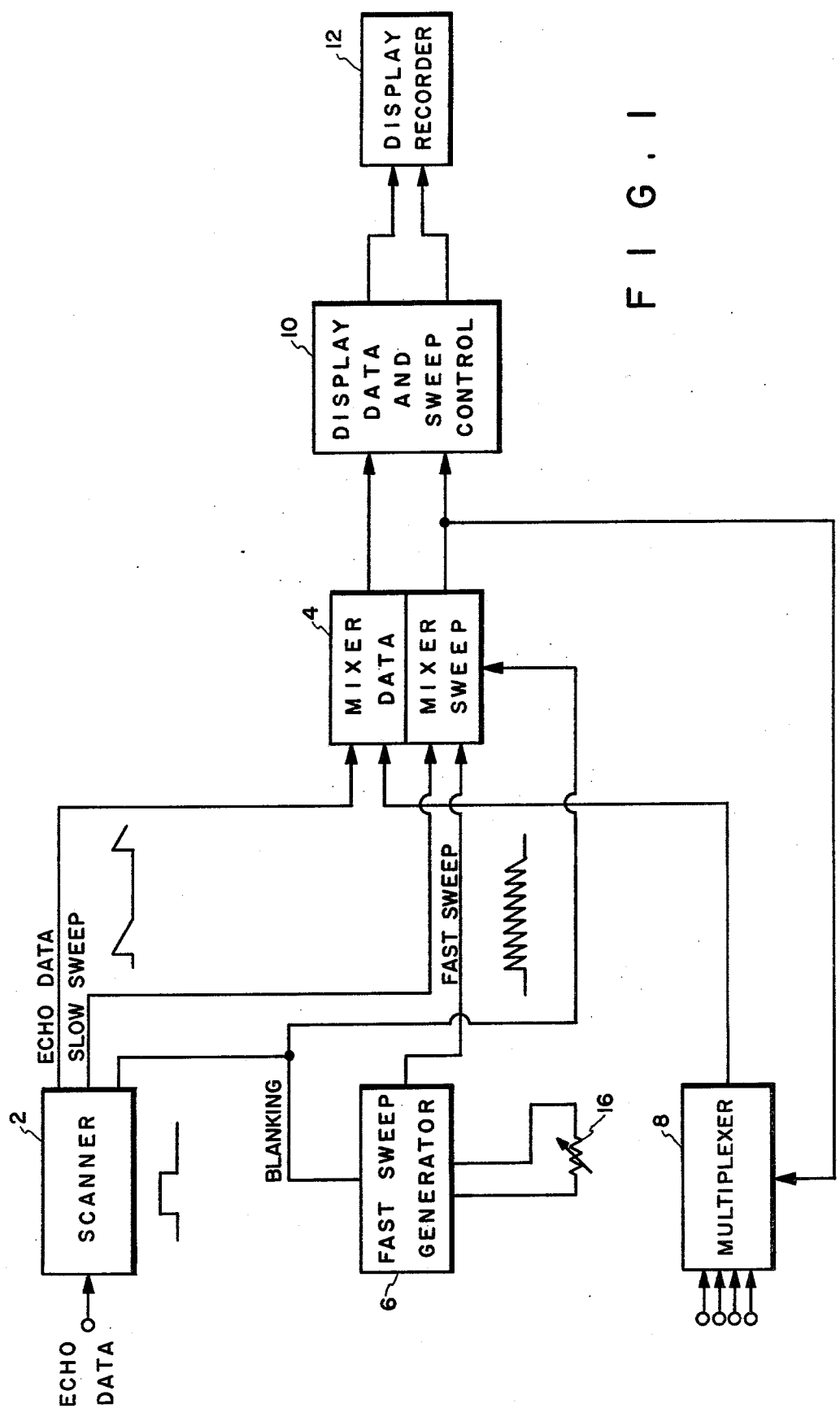
FIG. 1 is a blocked diagram of a control system embodying the present invention.

Referring now to FIG. 1 in more detail, there is shown an echo data scanner 2 which receives the echo data from the ultra-sound sensors. The scanner includes means for conditioning the echo signals for subsequent application to a display device as well as generating a pair of control signals. The first of these control signals comprises a relatively slow ramp pulse at spaced intervals. This ramp pulse is ultimately used to control the sweep of a suitable display device such as a cathode ray tube. The other control signal developed by the scanner is a blanking pulse which will be used to control other instrumentalities as will be seen hereinafter.

The echo data from the scanner 2 is fed to a data section of a mixer circuit 4. Similarly the slow sweep signal from the scanner is fed to the sweep section of the mixer circuit 4.

A fast sweep generator circuit 6 is arranged to generate a sawtooth wave ramp signal having a significantly higher frequency and a faster slope than that of the aforementioned slow sweep signal. The blanking signal which is in the nature of a square wave pulse and is coincident with the occurrence of a pulse of the slow sweep ramp signal, is applied to control the operation of the fast sweep generator 6. For purposes that will appear hereinafter, the fast sweep generator is rendered inoperative during the occurrence of such a blanking signal from the scanner 2. An output signal from the fast sweep generator 2 is also applied as an input signal to the sweep section of the mixer 4. The blanking signal, hereinbefore mentioned, is also applied as a control signal to the sweep section of the mixer 4. That blanking signal so controls the sweep section of the mixer that whenever a slow ramp signal is present, the circuitry within the sweep mixer is switched whereby only the slow ramp signal may be presented to the output terminal of the sweep mixer. On the other hand, when no slow ramp signal is present, hence no blanking signal, the mixer is switched whereby the fast sweep signal is presented to the output of the sweep mixer. Thus, at the output of the sweep mixer, there appears, in interleaved relationship, a succession of slow ramp signals with a number of higher frequency fast ramp signals positioned in the interstices between adjacent ones of the slow ramp signals.

The output signal from the sweep mixer is applied as control signal to a multiplexor 8. The multiplexor 8 is provided with a plurality of input terminals which may be connected to receive body function signals such, for example, as EKG signals. Thus the stepping of the multiplexor is controlled by the pulses of the sweep mixer output. The output of the multiplexor is, in turn, also supplied as an input signal to the data section of the mixer 4. The combined data signals output from the data section of the mixer 4 are applied to a display data and sweep control circuit 10 where the signals are conditioned for application to the input of a suitable display device 12. As hereinbefore mentioned, the display device 12 may include a cathode ray tube device. The cathode ray tube device may in turn either be the ultimate display or may provide means for effecting the recording of signals on a suitable recording medium. The output of the sweep section of the mixer 4 is also applied to a display data and sweep control circuit 10, the output of which, in turn, is applied to control the sweep of the beam of the cathode ray tube in the display device 12. In a manner well known in the art, the sweep signal is also used in conjunction with the display data signal to effect a proper conditioning of the display data signals to produce meaningful signals to the display device 12.

The fast sweep generator 6 is provided with an adjusting means 16 whereby the frequency of the sweep generator 6 may be so adjusted that an integral number of pulses of the fast sweep generator may be provided in the interstices between successive ones of the slow ramp signals. As mentioned before the operation of the fast sweep generator 6 is controlled by the blanking signal from the scanner 2. The purpose of this control is such that during the intervals when a slow ramp signal is present, the fast sweep generator is inoperative, producing no fast sweep pulses. At the moment, however, when the slow sweep signal terminates, the fast sweep generator is instantly triggered into operation whereby each series of fast sweep signals begins with a complete pulse. These two control features of the fast sweep generator both contribute to the desideratum of having an integral number of complete pulses of the fast sweep signal in the space between adjacent ones of the slow sweep pulses. The integral number of fast sweep pulses during each such interval, provides repeatable accuracy of the resultant data display.

Figure 2:
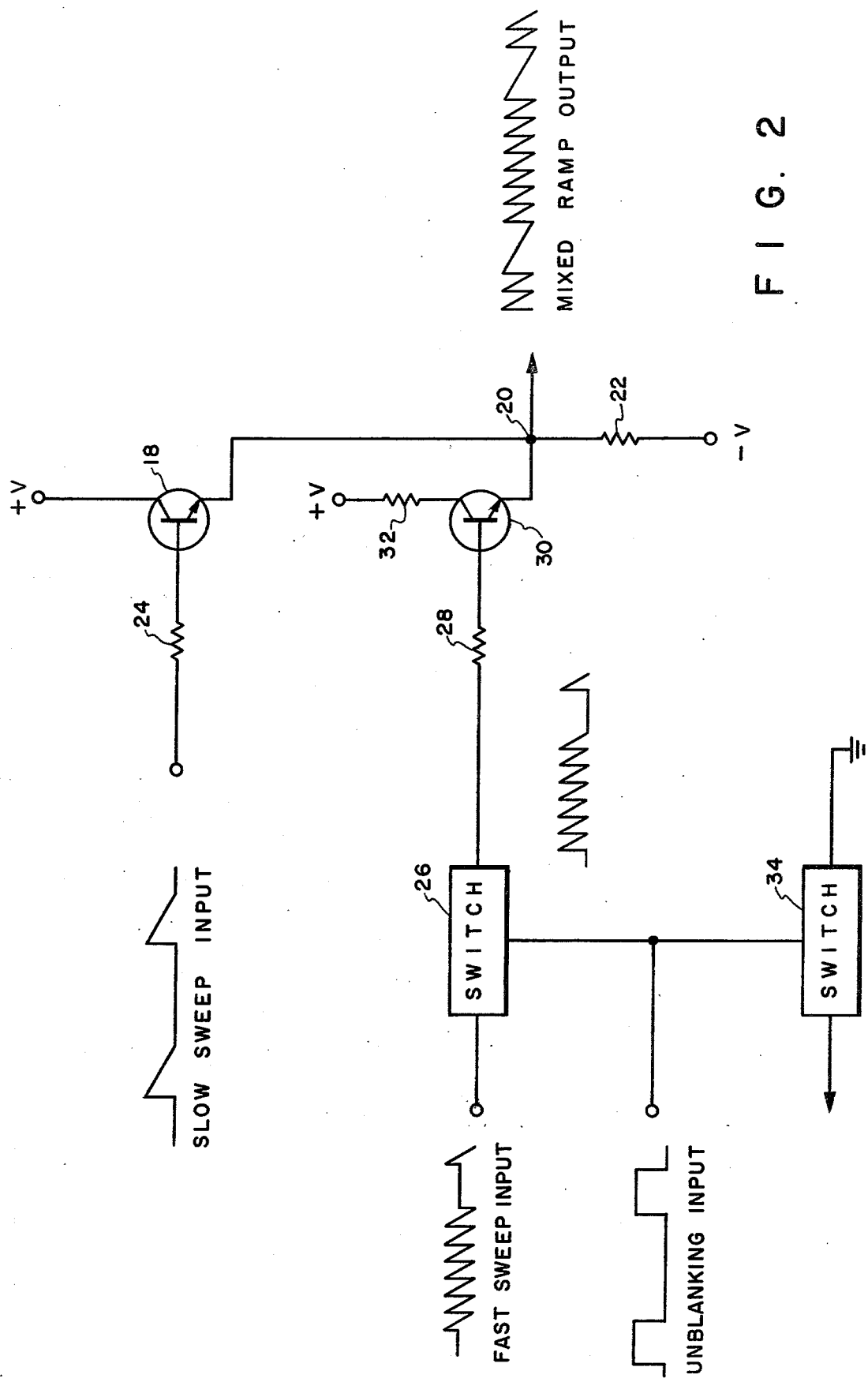
FIG. 2 is a schematic diagram of mixer circuit elements in accordance with the present invention.

In FIG. 2 there is shown significant elements of the sweep section of the signal mixer 4 as is shown in FIG. 1. A first buffer transistor 18 has its collector connected to a positive voltage source. The emitter of the transistor 18 is connected to a junction 20, thence, through a load resistor 22 to a negative voltage source. The spaced, slow sweep signals from the scanner 2 are applied through a coupling resistor 24 to the base electrode of the transistor 18. The output signal from the fast sweep generator 6 of FIG. 1 is applied to an input terminal of a solid-state electronic switch 26. The output of the switch 26 is applied through a coupling resistor 28 to the base electrode of a second buffer transistor 30. The collector of the transistor 30 is connected, through the resistor 32, to a positive voltage source while the emitter thereof is connected to the junction 20.

The switch 26 is gated by the blanking signals from the scanner 2 of FIG. 1. It will be remembered that the blanking signal is coincident with the pulses of the slow sweep signal. The blanking pulse signals are also applied to control a second solid state switch 34 one terminal of which is connected to ground and the other terminal of which is connected to a control element in the fast sweep generator 6 of FIG. 1 to block the operation of the fast signal generator during the occurrence of a blanking pulse signal, or, hence, a slow sweep pulse.

The buffer transistors 18 and 30 serve to isolate the two ramp signals from each other. Each of the transistors is connected as an emitter follower with the output of both being applied to the junction 20. The junction 20 is, in turn, connected, as shown in FIG. 1, to the display sweep control circuit 14 and to the multiplexor 8.

In operation, it may be seen that whenever a pulse of the slow sweep pulse train is applied to the transistor 18 a corresponding pulse appears at the junction 20 as an output signal representative of the slow sweep pulse. Simultaneously, whenever such a slow sweep pulse is applied to the input of the transistor 18, a blanking pulse is applied to open the switch 26 and to close the switch 34. The closure of the switch 34 prevents the generation of signals from the fast sweep generator 6 while the opening of the switch 26 prevents any signals from the fast sweep generator from being applied to the input of the transistor 30. When, however, there is no slow sweep pulse signal being applied to the input of the transistor 18, the switch 26 is closed and the switch 34 is opened. This allows the fast sweep generator to produce a train of pulses and to allow the thus produced pulses to be applied to the base of the transistor 30. As those signals are applied to the base of the transistor 30, corresponding signals are developed at the junction 20. Thus it may be seen that the signals appearing at the junction 20 comprise a composite signal of a plurality of spaced, slow ramp signals with adjacent such slow ramp signals separated by a series of fast ramp signals. As hereinbefore mentioned, there will be an integral number of complete pulses of the fast sweep signals between successive ones of the slow ramp signals.

Thus there has been provided, in accordance with the present invention, a simple and effective means for controlling the operation of a multi-data recording apparatus wherein control signals of two different frequencies are interleaved to effect the desired control.

The embodiments of the invention in which an exclusive property or privilege is claimed are defined as follows:

1. A control circuit for controlling a recording instrumentality comprising,
 first signal generator means,
 said first signal generator means being operative to generate first control signals characterized in being sawtooth pulse signals of relatively slow ramp with successive pulses occurring at spaced intervals,
 said first signal generator means being also operative to generate blanking signals, said blanking signals occurring coincidently with said sawtooth pulse
 first buffer amplifier means,
 coupling means for applying said first control signal to the input of said first buffer amplifier means,
 second signal generator means,
 said second signal generator means being operative to produce second control signals characterized in being sawtooth pulse signals of relatively fast ramp and of a significantly higher frequency than said first control signal,
 second buffer amplifier means,
 coupling means for applying said second control signals to the input of said second buffer amplifier means, said last named coupling means including a switching means responsive to said blanking signal to block the application of said second control signals to said second buffer amplifier means during the occurrence of said first control signals, output circuit means including a summing junction, and means connecting the output of said first buffer amplifier means and the output of said second buffer amplifier means to said summing junction whereby output signals of said control circuit comprise a composite of interleaved signals of said first and second control signals.

2. A control circuit as set forth in claim 1 wherein said second signal generator means includes means responsive to said blanking signal to inhibit the operation of said second signal generator means during the occurrence of said first control signals whereby each train of said second control signals being at a predetermined starting point.

3. A control circuit as set forth in claim 2 where said second signal generator means includes means for adjusting the frequency of said second control signals whereby to provide an integral number of complete pulses of said second control signals between successive pulses of said first control signal.

4. In a display/recording apparatus for displaying and recording at least two types of data, one type of such data being of a relatively slow response type data, the other type of data being of a relatively fast response type data, the combination comprising signal conditioning means for signals representative of said one type of data, said signal conditioning means including means for generating a first control signal characterized in being a sawtooth pulse signal of relatively slow ramp with successive pulses occurring at spaced intervals, and a blanking signal, said blanking signal occurring coincidently with each pulse of said first control signal, a second generating means for generating a second control signal characterized in being sawtooth pulse signals of relatively fast ramp and of a significantly higher frequency than said first control signal, said second generating means including means responsive to said blanking signal to inhibit the operation of said second generating means to block the generation of said second control signals during the occurrence of said pulses of said first control signals, a multiplexor for multiplexing signals representative of said other type of data a signal mixer, including first means for intermixing data signals representative of said two types of data, and second means for intermixing said first and second control signals to form a composite control signal, said second means of said signal mixer being responsive to said blanking signal to block said second control signals during the occurrence of said first control signals, said multiplexor being keyed by said composite signal, a data display control circuit, means for applying the mixed data signals and the composite control signals from said mixer to said data display control circuit to provide data display signals and data sweep control signals, and display-recorder means responsive to said data display signals and said data sweep control signals to provide a display and/or record representative of said two types of data.

* * * * *